Aug. 26, 1941.  W. H. HARSTICK  2,253,703
VALVE STRUCTURE
Filed March 23, 1939  2 Sheets-Sheet 1
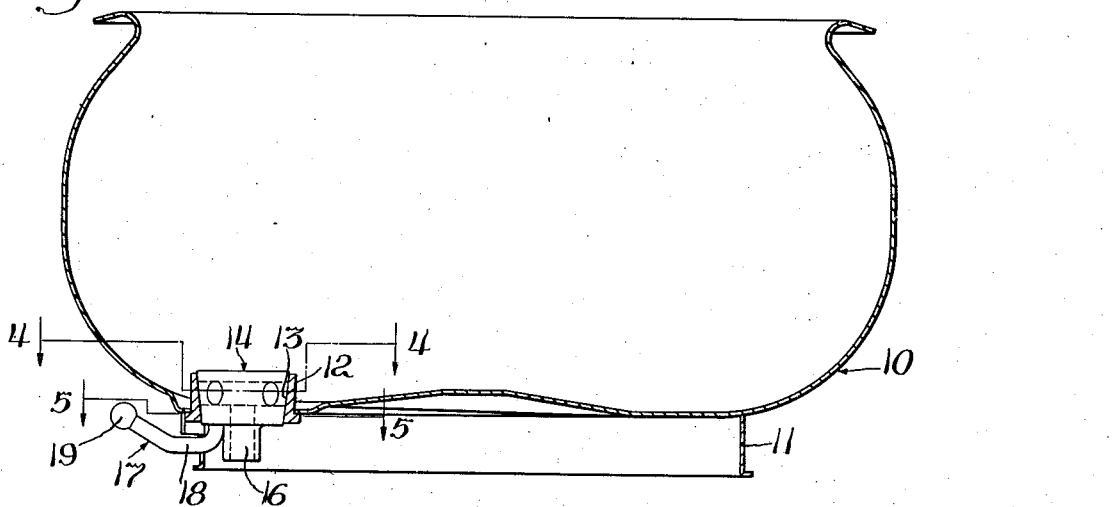
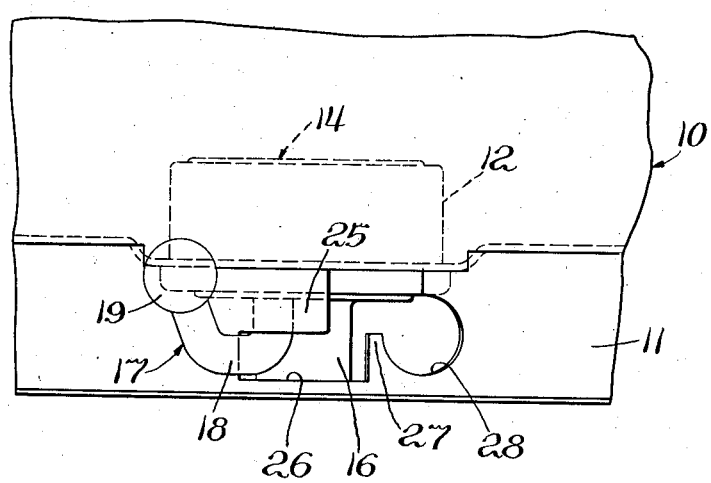
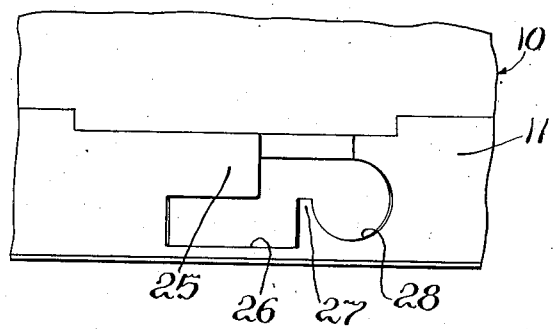
Inventor
William H. Harstick.
By Paul C. Pippel
Att'y.

Aug. 26, 1941.   W. H. HARSTICK   2,253,703
VALVE STRUCTURE
Filed March 23, 1939   2 Sheets-Sheet 2

Inventor
William H. Harstick.
By Paul O. Pippel
Atty.

Patented Aug. 26, 1941

2,253,703

UNITED STATES PATENT OFFICE 2,253,703

VALVE STRUCTURE

William H. Harstick, Milwaukee, Wis., assignor to International Harvester Company, a corporation of New Jersey Application March 23, 1939, Serial No. 263,689

2 Claims. (Cl. 137—21)

This invention relates to a valve structure. More specifically it relates to a faucet valve for use with a cream separator supply can.

It is the usual practice to provide a supply can for cream and milk over a cream separator with a valve at the base of the can which may empty the milk and cream directly into the separator. It is desirable to make the valve as simple in construction as possible, so that it may be easily cleaned.

An object of the present invention is to provide an improved valve for a cream separator supply can.

A further object is the provision of an improved valve structure for a container.

Another object is to provide a new and novel valve structure.

According to the present invention, a supply can for cream and milk is provided with an opening in its space in which is secured a valve seat member having frusto-conical inner surface. A valve of similar shape fits within the seat from the inside of the can and has a handle extending on the outside of the base of the can. The handle is of such a shape as to permit the valve to be removed by being pushed up from the bottom into the can.

In the drawings:

Figure 1 is a section through a supply can, showing the improved valve structure;

Figure 3 is a side view of a portion of a can and the valve structure;

Figure 6 is a view similar to Figure 3, but with the valve removed

Figure 4:
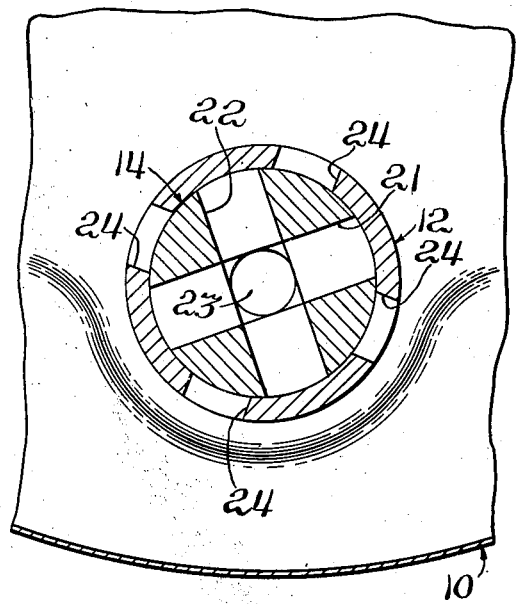
Figure 4 is a view taken on the line 4—4 of Figure 1.

A supply can 10 is supported on a flange member 11 by which the can is supported on a cream separator, not shown. At one side of the base of the supply can 10 is an opening in which is secured, as by soldering or welding, a seat member 12 of annular form. The seat has a frusto-conical inner surface 13 which diverges in a direction from the base of the can toward the inside thereof. A valve 14 fits within the valve seat and has a frusto-conical surface 15 similar to the surface of the seat member 12. A projection 16 extends from the base of the valve. A control member 17 for the valve extends from the base thereof at one side downwardly and then in a direction generally parallel and in spaced relation to the base and curved side of the supply can 10. The member comprises a stem 18 of substantially circular section and an enlarged spherical end portion 19. As seen in Figures 1 and 4, there are intersecting through passages 21 and 22 cored in the valve at right angles to one another, as well as a passage 23 extending from the intersection of the passages 21 and 22 down through the projection 16. In the open position of the valve, the passages 21 and 22 are in registration with four openings 24 in the seat member 12.

Figure 5:
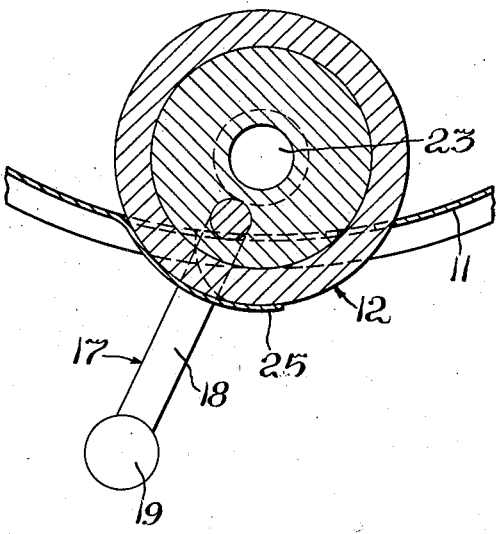
Figure 5 is a view taken on the line 5—5 of Figure 1.

As will be seen from Figure 5, the valve seat 12 is so far to the side of the base of the can 10 as to intersect the supporting flange 11. Consequently, the part of the flange which the valve seat intersects is cut away so as to leave a portion 25, which is bent out of the normal circular contour of the flange, so as to contact the periphery of the valve seat. As seen in Figure 3, there is an opening 26 below the portion 25 of a width between the diameters of stem 18 and the spherical end portion 19. The opening 26 is of sufficient length to allow the valve handle 17 the necessary angular movement between a closed position and an open position where the openings 24 in the seat 12 and the passages 21 and 23 are in registration. At the right end of the opening 26, as seen in Figures 3 and 6, there is an upstanding projection 27 which is spaced from the end of the portion 25 a distance substantially equal to the diameter of the stem 18. Beyond the projection 27 is a circular opening 28 of a diameter somewhat larger than the diameter of the end portion 19 of the handle 17.

The control member 17 for the valve member 14 normally extends through the opening 26. In the open position of the valve, the handle member 17 rests at the right side of the opening 26 against the projection 27. In the closed position of the valve, the handle 17 rests against the left end of the opening 26. Since the width of the opening 26 is intermediate the diameters of the end portion 19 and the stem 18, the valve 14 will not fall out in case the can 10 is inverted.

Figure 2:
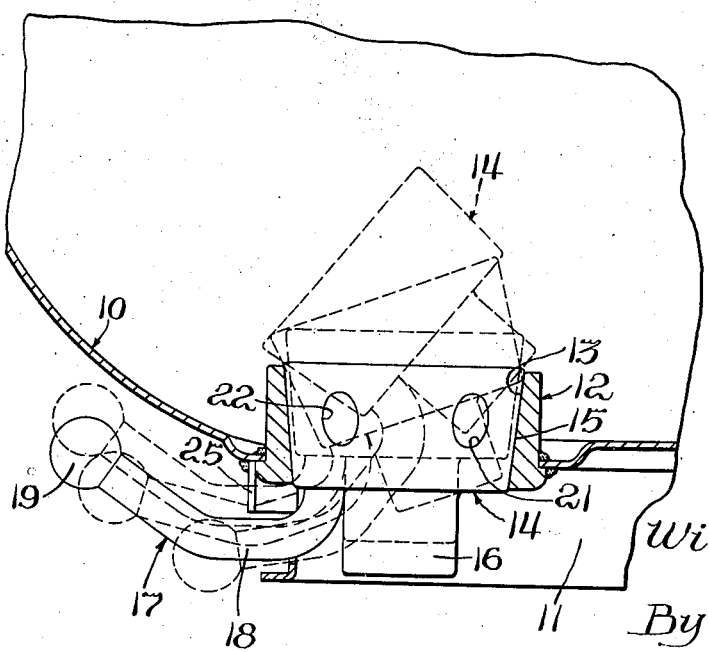
Figure 2 is a similar section, showing the valve structure on an enlarged scale.

When it is desired to remove the valve, the handle is moved from the opening 26 between the portion 25 and the projection 27 into the opening 28. The valve may now be removed by being pushed up from the seat 12, the spherical end portion 19 passing through the circular opening 28. The dotted line positions of Figure 2 show the various positions the valve 14 and handle 17 occupy during removal of the valve. It will be noted that removal is facilitated because the handle of the valve is of generally curved shape, following the curvature of the base and side of the supply can 10 and in spaced relation thereto.

It will be observed from the above description that a new and novel valve construction has been provided which is of simplified form. With the arrangement shown, the valve is easily removed from its seat for cleaning and inspection. The valve seat is itself of simple construction and is consequently easy to clean. Because the valve seats on the seat from the inside of the can and has a control member which extends on the outside of the can, a simplified construction is possible. Heretofore, when valve constructions were utilized having external controls, a more complicated form of valve seat was required since the valve had to seat on the outside of the can. Under the present invention, it has been made possible to provide a valve of simplified construction which seats from within a container structure and has its control member outside of the container structure. It is obvious that the novel valve of the present invention is not limited in its use to a cream separator supply can, but may be used on any sort of a container structure, as well as in any wall structure in which a fluid control valve is adapted to be used.

The invention is to be limited only within the scope of the appended claims.

What is claimed is:

1. A tank having a downwardly extending support and an opening provided in its bottom wall, said support provided with an elongated aperture which consists of a main portion and a laterally offset portion, said offset portion being enlarged at its extremity remote from said main portion, a rotary valve removably seated in said opening for rotation therein and having a control member extending downwardly therefrom and then outwardly through said aperture, said control member having an enlarged free end of a dimension greater than any part of the aperture except the enlarged portion, said main portion of the aperture permitting normal operation of said control member and valve and said enlarged portion permitting removal of said control member from said enlarged portion and said valve from said opening.

2. A tank having a bottom wall in which is provided an opening and a side wall in which is provided an elongated aperture having a main portion and a laterally offset portion, said offset portion being enlarged at its extremity remote from said main portion, a rotary valve removably seated in said opening for rotation therein and having a control member extending through said aperture to a point externally thereof, said control member having an enlarged free end of a dimension greater than any part of the aperture except the enlarged portion, said main portion of the aperture permitting normal operation of said control member and valve and said enlarged portion permitting removal of said control member from said enlarged portion and said valve from said opening.

WILLIAM H. HARSTICK.